Feb. 23, 1960  H. G. TWIFORD  2,925,837
TIRE MOUNTING STAND WITH ROTATABLE WHEEL SUPPORT
Original Filed May 13, 1954  2 Sheets-Sheet 1

INVENTOR.
HARRY G. TWIFORD
BY
*McGrew and Edwards*
ATTORNEYS

Feb. 23, 1960          H. G. TWIFORD          2,925,837

TIRE MOUNTING STAND WITH ROTATABLE WHEEL SUPPORT

Original Filed May 13, 1954          2 Sheets-Sheet 2

INVENTOR.
HARRY G. TWIFORD

BY
McGrew & Edwards
ATTORNEYS

United States Patent Office 2,925,837
Patented Feb. 23, 1960

2,925,837

TIRE MOUNTING STAND WITH ROTATABLE WHEEL SUPPORT

Harry G. Twiford, Denver, Colo.

Original application May 13, 1954, Serial No. 429,566, now Patent No. 2,825,395, dated May 4, 1958. Divided and this application April 18, 1957, Serial No. 653,632

4 Claims. (Cl. 144—288)

This invention relates to tire mounts and more particularly to tire mounts adapted to facilitate the mounting and dismounting of pneumatic tires on a vehicle wheel.

In general, the tire mount of the invention comprises a table for holding a vehicle wheel in optimum position for manipulation, and which automatically centers the wheel on the table when the wheel is secured thereto. The tire mount provides means for permitting the operator to perform all mounting and dismounting operations from a single position adjacent the device. The tire mount provides an automatically-centering tire bead breaker which can effectively be operated by one man.

It is an object of the invention to provide a tire mount which requires a minimum of lifting of a vehicle wheel to place it in optimum position for manipulation.

It is another object of the invention to provide a tire mount which automatically centers a wheel when secured thereto and which locks and unlocks the wheel thereon with a simple lock arrangement.

It is another object of the invention to provide a machine which permits an operator to perform all the manipulations thereon from one position adjacent the machine.

Another object of the invention is to provide a machine which requires a minimum of floor and work space.

Still another object of the invention is to provide a tire mount which is simple to operate and simple to maintain and repair.

These and other objects and advantages of the invention may be readily ascertained by referring to the following description and drawings, in which.

This application is a division of copending application Serial No. 429,566, filed May 13, 1954, entitled "Tire Mount," now United States Patent No. 2,825,395.

Figure 1:
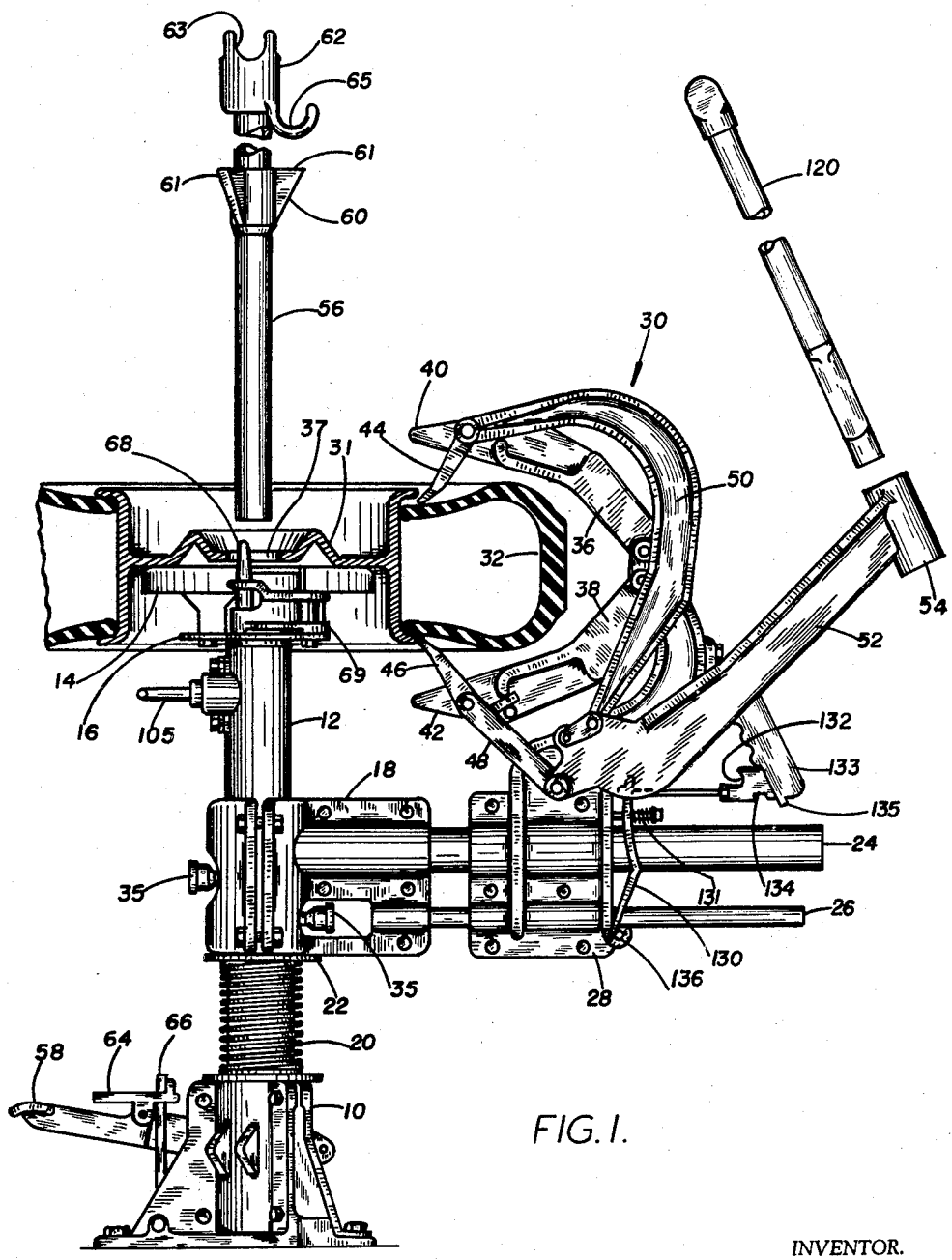
Fig. 1 is a side elevation of the tire mount showing a wheel and tire, in cross section, in position thereon.

In the device illustrated in Fig. 1, the tire mount comprises a base 10 and an upright main support tube 12 which is securely fastened to the base. The base, as shown, consists of three parts bolted together and bolted to the floor to provide a solid mount for an upright tube. However, the base may be made of a single piece or of as many pieces as may be deemed necessary for any particular application. A wheel table 14 carried on a table support 16 is mounted on the upper end of the main support tube 12. Preferably, the table is covered with a rubber to prevent marring of a vehicle wheel placed thereon. The wheel table 14 is adapted to rotate in one direction only, as will be more fully explained with reference to the construction of the lock and rotation mechanism for the wheel. A breaker mount 18 is pivotally supported on the main support tube, and the breaker mount rests on a counterbalanced spring 20. A washer 22 is provided between the spring and the breaker mount for unhindered rotation of the mount on the support tube. Extending laterally from the main support tube from the mount 18 is an upper breaker way 24 and a lower breaker way 26. Reciprocally mounted on the two breaker ways is a breaker frame 28. A bead breaker 30 is supported from the breaker frame in an upright position and in a position to be associated with a wheel 31 and a tire 32 disposed on the mount. The breaker frame 28 is reciprocable on the two breaker ways, for placing the bead breaker 30 in position for use with the various sizes of tires which may be mounted on the table. An automatic breaker lock, described in detail below, is provided for the breaker frame 28 which permits free movement toward the main support tube, but locks the device against movement outwardly on the breaker way. A stop may be provided to prevent accidental removal of the mount from the ways. The breaker lock must be manually opened to permit the breaker frame to be moved outwardly toward the open end of the ways 24 and 26. Grease cups 35 are provided on the breaker mount clamp to reduce friction and provide for free rotation of the clamp on the main support tube. The bead breaker comprises a pair of pincher-action breaker jaws including an upper breaker jaw 36 and a lower breaker jaw 38. Rim stops 40 and 42 are provided at the outer extremity of the jaws 36 and 38 respectively for stopping inward movement of the jaws after the bead has broken to prevent damage to the tire. A toggle jaw 44 is pivotally secured adjacent the rim stop 40 on the upper breaker jaw and a toggle jaw 46 is pivotally secured adjacent the lower rim stop 42 on the lower breaker jaw. A push link 48 and a tension link 50 are secured through a series of linkages to a handle 52, which has a handle socket 54 at the outer end thereof. The various linkages of the breaker jaws provide a tremendous mechanical advantage so that a slight force exerted on the handle exerts a greatly-multiplied force against the tire bead to be freed from the rim of a wheel.

The wheel is secured in place on the wheel table by means of a center post 56 which passes through the hub hole in the wheel into the interior of the main support tube where a clamp arrangement, which is actuated by means of a clamp-down pedal 58, securely holds the center post in the main support tube. The center post has a wheel clamp 60 secured near its upper end, and the wheel clamp is adapted to rest on the edge 37 of the hub hole of the wheel to clamp the wheel in position. The wheel clamp has three triangular-shaped lugs 61, which form a frusto-conical section for centering the wheel on the wheel table when the center post is pulled tight against the wheel. An anvil or handle support 62 is provided at the upper end of the center post to aid in the use of tools for removing the tire from the wheel. A tire tool may be rested either in cradle 63 or hook 65 to provide leverage. The center post 67 is pulled down and locked in position by the downward movement of the clamp-down pedal 58, and the pedal is locked in down position by means of a clamp-down release pedal 64 operating on a retainer rod 66. When the clamp-down pedal is in down position, it may be released by pushing the clamp-down release pedal to release its grip on the retainer rod.

A lug pin 68 is secured to the table support by means of a roll pin 69 to permit pivotal movement of the lug pin. The lug pin is tapered to fit into the lug holes of the wheel to prevent rotation of the wheel relative to the wheel table. The lug pin may also be spring-loaded so as to press tightly against the lug hole of the wheel and, thus, insure a tight fit when the wheel is seated on the table. A tight, secure fit of the lug pin in the lug hole minimizes damage to the lug hole when heavy forces are applied to rotate the wheel, or stop the wheel, etc., A lug pin thus in place provides for no relative motion between the wheel and table or rotation of both the wheel and table together. The lug pin also provides for holding the wheel in position on the wheel table so that the center post does not have to be drawn down so tightly as to prevent movement therebetween, and damage the wheel thereby.

Figures 2, 3, 4:
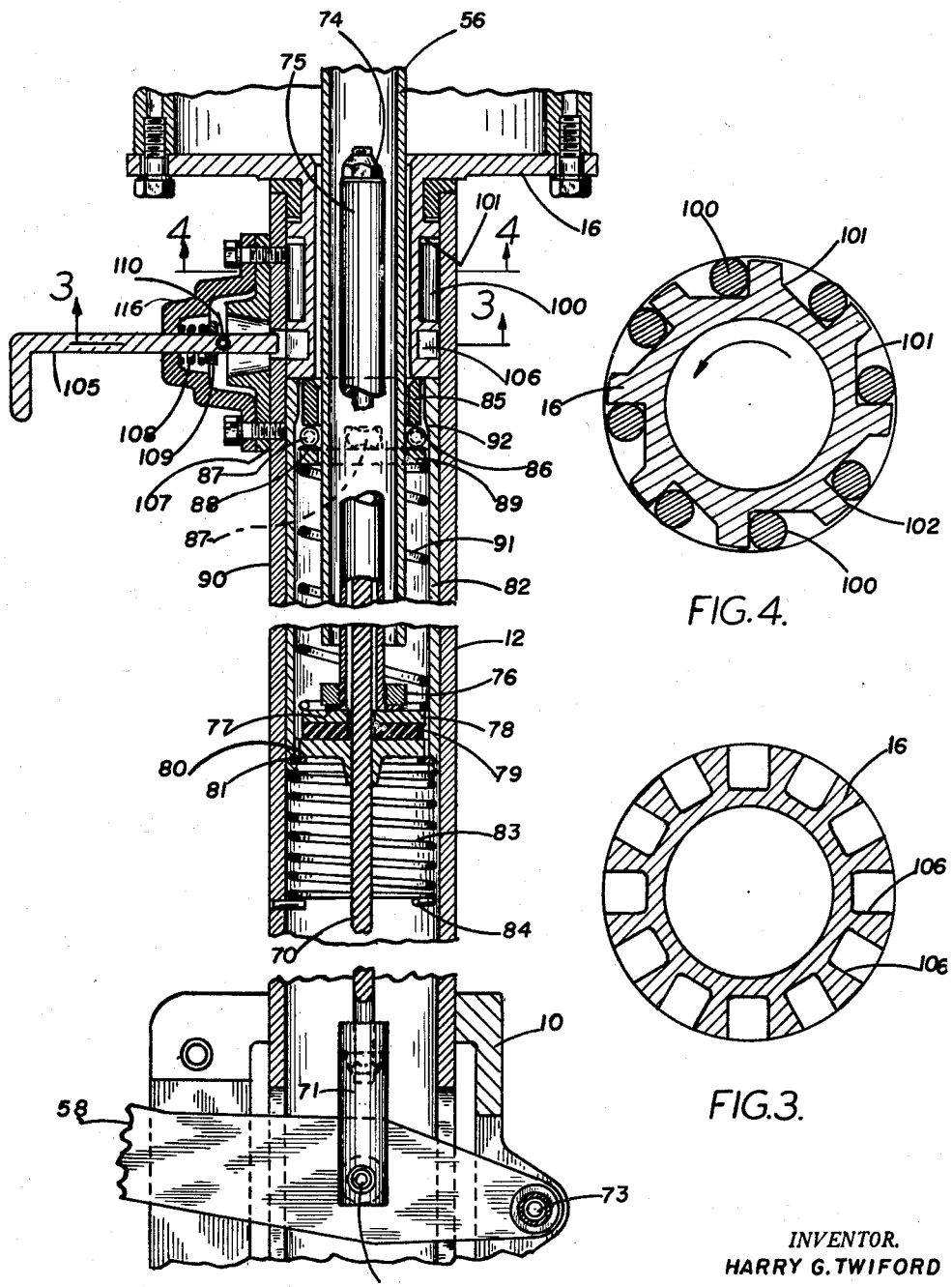
Fig. 2 is a cross sectional elevation of a detail of the tire lock and table rotation mechanism.
Fig. 3 is a cross section detail of the table lock, taken along section 5—5 of Fig. 2.
Fig. 4 is a cross sectional detail of the table rotational mechanism taken along section line 6—6 of Fig. 2.

The table rotary mechanism is shown in detail in Figs. 2, 3 and 4. The wheel clamp lock down system comprises a clamp-down rod 70 which extends from the table support 16 to the clamp-down pedal 58. The clamp-down rod is secured to the clamp-down pedal by means of a clamp-down yoke 71, which is secured to the clamp-down pedal by means of a pin 72. A clamp-down pedal clevis pin 73 provides means for pulling the rod downwardly when the pedal is pushed downwardly. A clamp-down spacer rod 75 is secured to the clamp-down rod by means of a nut 74 at the top of the rod. To prevent accidental removal of the nut, caused by rotation of the table, the nut should be drilled and cotter pinned. An upper bearing seat 76 is threaded onto the lower end of the spacer rod 75. The upper bearing seat 76 is seated on an oil-tight bearing 77 to permit free rotation of the spacer rod and upper bearing seat 76. The oil-tight bearing 77 is seated on a center bearing seat 78 which in turn seats on a resilient bearing washer 79. The resilient washer provides means for taking up shocks, etc. The rubber bearing washer seats on a lower bearing seat 80 which in turn rests on a bearing seat retainer ring 81. The ring 81 is secured to a clamp-down cone 82. The cone 82 seats on a lift spring 83 which is secured in position in the main support tube 12 on lift spring roller pins 84. The lift spring 83 holds the lock assembly in uppermost position in the main tube against the lower end of the table support 16 when the center post 56 is not in position in the tire mount. Telescoped within the clamp-down cone is a clamp-down retainer 85 which has a series of openings 86 around the bottom thereof. Juxtaposed in each opening is an hourglass-shaped clamp-down roller 87 which is retained in place by means of a clamp-down roller ring retainer 88 seated on a clamp-down retainer cap 89, which is held in place by means of plural screws 90 engaging the retainer 85. The clamp-down retainer 85 is maintained in place adjacent the table support by means of a clamp-down retainer spring 91 which seats on the center bearing seat 78. When the clamp-down pedal 58 is depressed, the clamp-down rod 70 is pulled downwardly pulling the clamp-down cone 82 downwardly so that the cone face 92 of the cone engages the clamp-down rollers 87, to force the rollers against the center post 56. On releasing the clamp-down pedal, the clamp-down cone is forced back up against the table support by means of the clamp-down retainer spring 91, as indicated in Fig. 2. The hourglass-shaped retaining rollers are shaped to provide a substantial line, or area, contact between the rollers and the center post 56 so that there is a large bearing area on the center post for a secure lock. While the drawings indicate four retaining rollers, any number may be utilized which may be required to adequately hold the center post. For example, six rollers have been found to be satisfactory in holding a center post for machine adapted for use with all common sizes of passenger tires and most truck tires.

The wheel table is adapted to rotate counterclockwise only. A series of eight cylindrical rollers 100 fit loosely in slots 101 in the periphery of the lower cylindrical section of the table support 16. The slots have an enlarged portion adjacent a rear face 102 which provides a very loose fit for the roller 101 providing free rotation of the rollers and the table.

When the table is rotated counterclockwise, following the arrow as shown in Fig. 4, the cylindrical rollers ride against the face 102, but when the rotation is reversed, that is clockwise, the cylindrical rollers wedge against the sloped surface 103 and the inner surface of the main support tube. This wedging action completely locks the table from rotation in a clockwise direction. The locking action is accomplished in a minor fraction of a single revolution of the wheel table. While ball bearings may be utilized in the same manner as the cylindrical rollers, the cylindrical rollers are preferable as they provide a larger area of contact with the wedging surfaces so that there is less possibility of scoring and denting the surfaces when the wheel is violently rotated clockwise.

The wheel table may be completely locked against rotation in either direction by means of a lock handle 105 which moves in and out of register with a series of sockets or holes 106 in the periphery of the table support immediately next to the handle. To facilitate operation of the rotary lock, the handle is maintained under spring tension which aids in forcing the handle inwardly to register with one of the peripheral holes 106 adjacent thereto. The handle is reciprocally secured in a cap 116 which is bolted to a base 107. A spring 108 is retained between the cap and a washer 109 which is secured to the handle 105. A roll pin 110 retains the handle out of register of the peripheral holes 106 by riding on the top of base 107 except when the handle is rotated to the position where the pin registers with a slot (not shown) in the base 107 to permit the handle to move inwardly and engage one of the slots 106.

In the operation of the tire mount, a wheel and mounted pneumatic tire is lifted onto the table, and any lug hole of the wheel is placed over the lug pin 68. The face of the table may be covered with a medium durometer rubber so that the damage to the wheel will be minimized. The wheel is placed flat on the table, and the tapered lug pin fits the lug hole tightly so that there will be no movement between the wheel and the table. The center post and wheel clamp assembly is then placed through the hub hole in the wheel and down through the hole center of the table into the lock assembly in the main support tube. The sloping sides of the wheel clamp project into the hub hole and tend to center the wheel around the post and on the table. By depressing the clamp-down pedal, the clamp-down roller engages the center post pulling the assembly downwardly moving the wheel centerwise of the table and ultimately locking the center post in the assembly. The wheel is centered with a very small amount of shifting, and only a small amount of pressure on the foot pedal is required to center the wheel and to clamp the center post into locked position. The rod 66 and clamp-down assembly 64 serve as a mechanism to hold the wheel clamp in its clamped position. Prior to mounting the wheel on the table, the breaker clamp is moved out of the way so that the wheel can be easily lifted onto the table without interference from the breaker.

The valve is removed from the valve stem of the tire, and, after all air has been released from the tire, the breaker mechanism is swung around to any convenient location and the jaws thereof are pushed in position to circumscribe the tire. The counterbalanced spring offsets nearly the entire weight of the breaker so that little or no effort is required to place the clamp in approximate bead-breaking position on the tire. With the bead breaker in approximately the correct height for breaking the bead of the tire, it is slid forward on the breaker ways so that the jaws encompass the tire. After the jaws of the breaker pass the high part of the tire, the handle should be depressed to cause the jaws to move together toward the tire. By moving the jaws together in such a manner the breaker may be moved forwardly without much danger of overshooting the rim and having the toggle jaws pass beyond the rim into the wheel portion. The toggle jaws are brought up to the rim to fit snugly against the inner section of the side wall and the wheel rim in a position where they will not slip over the rim but will slip in between the rim and the tire.

With the toggle jaws in position, depressing the handle forces the toggle jaws in between the rim and the bead so that further movement of the handle downwardly causes the toggle jaws to bear on the bead rather than on the side wall of the tire. The toggle jaws are pivotally secured to the end of the breaker jaws to provide a small movement of about a half an inch at the end of the toggle jaw. This permits the toggle jaw to move in under the rim to ride and bear on the bead of the tire rather than on the tire side wall. The first movement of the handle forces the toggle jaw beneath the rim as indicated in Fig. 1, and further movement causes the toggle jaws to move toward each other breaking both beads at the same movement. The movement of the handle is continued until the rim stop 40 and the rim stop 42 rest respectively on the upper and lower rim of the wheel, at which point both beads of the tire are broken away from the wheel at the point between the breaker jaw and for a distance on each side. Since considerable force will be required to break the bead from most wheels, a tire tool is inserted into the handle socket 54 to provide added leverage in the operation of the breaker. Movement of the handle breaks both beads of the tire away from a wheel with one easy movement.

By revolving the breaker counterclockwise while the breaker is closed, opening the breaker and revolving it clockwise to its original position, the wheel can be rotated any desired amount. In this manner the operator may break the bead of the entire wheel while standing in one spot. As the wheel table will only turn in one direction, there is no danger of the operator moving the table back and forth in one position without actually rotating the wheel. If the breaker is clamped in position on the tire, the wheel table will only rotate counterclockwise. The breaker must be released from the tire to move it clockwise back to its original position.

In breaking the beads of a tire, the jaws should be closed until the hooks or rim stops come to rest against both rims. After the rim stops have closed on both rims, further pressure will have no effect on breaking the bead, but will only cause damage to the wheel or to the breaker. Operating the handle until the stops rest on the rim provides a positive break of both beads over a segment of the rim.

After the bead has been broken away from the wheel on both sides, the breaker is pulled back along the breaker ways out of the way of the tire for the demounting operation. The tire tool which has been used as a handle in the breaker is removed for use in the subsequent demounting and mounting operation.

Rubber lubricant or soap is then applied to the tire a short distance clockwise from the point at which a tire tool is to be applied. The demounting end of a tire tool is hooked under the upper bead of the tire on the side of the wheel opposite the position of the operator. By prying downwardly, toward the operator, on the tire tool, the upper bead is lifted over the rim. The tire tool is brought down along the right side of the center post, operator's right as facing the center post. By pushing the tire tool in a clockwise direction against the center post, a segment of the upper bead is lifted over the wheel rim. As the pull is clockwise, the wheel will not rotate, and the bead will be pulled up along a segment. By rotating the wheel counterclockwise, the wheel is moved to a position where the operator may lift another segment of the bead over the rim without moving his position in respect to the wheel. This operation of lifting the bead over the rim is continued until the entire upper bead is lifted over the rim of the wheel. If there is a tube in the tire, it is removed at this point. If the tire is to be removed entirely from the wheel, the demounting end of the tire tool is similarly slipped under the lower tire bead. The tire tool is then pulled down to substantially horizontal position lifting a segment of the bead over the upper rim of the wheel. By pulling the tire tool clockwise, a segment of the bead is lifted over the rim. The tire may then be rotated counter- clockwise and another section of the bead lifted over the rim by rotating the tire tool clockwise. This procedure is followed until the tire is dismounted. This demounting step is easily accomplished due to the fact that the wheel rotates counterclockwise, and when the tire tool is pulled clockwise, the tendency of the tire to rotate clockwise is stopped by the retaining means, which permits only counterclockwise rotation of the wheel. When the lower bead is removed from the wheel, the tire may then be removed from the tire mount.

The casing is placed back on the wheel in a similar manner to its removal, except that the mounting head of a tire tool is used. In the case of mounting the casing on the wheel, the mounting head is hooked over the rim of the wheel, and the lower bead of the tire is hooked over the rim of the wheel. The tire is placed on the wheel in a tilted position so that the bead on the side of the wheel opposite the operator is below the rim and below the mounting tool. By moving the mounting tool clockwise, the lower bead of the tire is forced under the rim of the wheel. The wheel is rotated counterclockwise to bring a new segment of tire into position for forcing the bead under the rim with the tire mount. After the lower bead is placed over the rim of the wheel, the tube is then placed in the casing and the valve stem is pulled through the valve stem hole in the wheel. The upper bead of the tire is then forced over the rim in a similar manner to the placing of the lower bead over the rim of the wheel. With the upper and lower beads in position on the wheel, and with the tube inside, the rotation lock handle 105 is released to lock the wheel in locked position. With the wheel locked, the tire may be rotated sufficiently to center the tube in a position to permit the valve stem to protrude through the hole at right angles to prevent damage thereto. With the wheel in this locked position, the casing may be readily moved on the wheel to permit centering of the valve stem without removing the wheel from the tire mount. The rotary lock is provided for any other operation that requires that the wheel may be held stationary without rotation. The wheel may be locked in position by turning the rotary handle to permit it to drop into a hole 106 on the table support into locking position, and it is simply unlocked by pulling the rotary lock outwardly and rotating it so that the rotary lock roll pin 110 seats on the rotary lock base which holds the handle in open position. After the tube is squared in the casing, it is filled with air, and the wheel may then be removed from the tire mount.

The wheel is removed from the tire mount by releasing the wheel clamp, which is accomplished by pressing the clamp-down release pedal to release its holding action on the rod so that the clamp-down rod is released and it returns, under spring pressure, back to original position. The clamp-down cone, likewise, returns to its position against the table support as does the clamp-down retainer. The center post may then be removed from the tire mount, and the tire lifted off the table.

The single-direction rotation of the table permits all operations to be performed by the machine operator from one position next to the machine. The high-mechanical-advantage tire bead breaker, which breaks both the upper and lower tire beads away from the wheel rim in one motion, permits one man to break the beads of most tires which are found on vehicles on the highways of the country. The machine, likewise, permits one man to perform all the operations required for mounting and demounting a tire from a wheel and from a single position on one side of the machine. This provides a considerable saving in floor space required by the machine and a considerable saving of space required in the manual operation of the machine. The machine requires only about one-fourth the floor space required by other machines in which the operator must walk completely around the machine to perform all operations in mounting and demounting a tire from a wheel. Likewise, the amount of motion required by the operator in the performance of the duties of mounting and demounting a tire is substantially decreased. With a machine of the invention, the operator is no longer required to walk around the machine, all operations being performed from one side of the machine, and all the operations may be performed equally as well from any side of the machine. Thus, the machine can be placed in any convenient location in the garage or filling station where it is to be used, rather than taking up valuable space from the middle of the floor.

In mounting and demounting tire casings from a vehicle wheel it is advantageous and in some cases imperative to lock the bead breaker on the breaker ways. A simple and efficient lock is illustrated in Fig. 1. The lock comprises a breaker lock 130 which is pivotally mounted on the breaker frame 28 by means of a roller pin 136, and encompasses the breaker way 24. The breaker lock has a hole therethrough which loosely fits the breaker way 24 but which grips the way 24 when moved to an angle to the way. A spring mount 131 urges the lock into locked position on the way 24. A trigger 132 is secured to the lock and a handle grip 133 provides means for releasing the lock. The trigger may be locked in open position by moving it toward the grip so that notch 134 aligns with and drops over handle extension 135. The grip aids in moving the breaker along the ways as it applies the moving force substantially parallel to the ways. The trigger and grip mechanism provides means for easy locking and unlocking the breaker lock, as well as for moving the breaker in correct position.

With tires, for example safety tires, the bead very tenaciously holds to the wheel rim, and a considerable force is required to break the bead. The force exerted moves the toggle jaws and the breaker away from the bead as the tire sidewall gives permitting movement of the breaker. To prevent such back movement, the breaker lock is provided which positively retains the toggle jaws in position on the bead.

While the invention has been described with reference to specific illustrations, there is no intent to limit the invention to the details so set forth, except insofar as defined in the following claims.

I claim:

1. In a tire mount having an annular wheel-supporting table, a tubular support for said table, tubular detachable means having a wheel clamping head adjacent one end thereof, said tubular means being adapted to telescope with said support and extend through a vehicle wheel for releasably holding such a wheel centerwise of the table, and lock means for releasably securing said tubular detachable means to said support, said lock means including a plurality of hour-glass rollers mounted circumferentially in a tubular mount in position to contact said tubular detachable means, spring means mounted against said tubular mount arranged to hold said tubular mount in an upper position, and means inclusive of a tubular cam mounted externally of said tubular mount and arranged to be moved so as to force said rollers into holding position against said tubular detachable means.

2. In a tire mounting device, an upright support member, a rotatable table member mounted on said support member, means for releasably securing vehicle wheels to said table member for conjoint rotation therewith, and wedging means arranged to move into wedging contact with both said members on movement of said table member in one direction and thereby prevent rotation in that direction and be maintained out of contact with one said member for substantially free rotation of said table member in the opposite direction.

3. In a tire mounting device, an upright support member, a rotatable table member mounted on said support member, means for releasably securing vehicle wheels to said table for conjoint rotation therewith, a lug pin secured to said table and adapted to engage a lug hole on a held wheel to prevent relative motion between said table and carried wheel, and wedging means arranged to move into wedging contact with both said members on movement of said table member in one direction and thereby prevent rotation in that direction and be maintained out of contact with one said member for substantially free rotation of said table member in the opposite direction.

4. In a tire mounting device, an upright, tubular support member, a rotatable table member telescoped over the upper end of said support member and arranged to hold a vehicle wheel, means for releasably securing a vehicle wheel substantially centerwise of said table member for conjoint rotation therewith, a series of wedge shaped slots in one of said members with the openings thereof substantially covered by the telescoped portion of the other said member, and a roller mounted in each said slot and arranged to move into wedging contact with both said members on movement of said table member in one direction and thereby prevent rotation of said table member in that direction and be maintained out of contact with at least one of said members for substantially free rotation of the table member in the opposite direction.

References Cited in the file of this patent

UNITED STATES PATENTS

| Number | Name | Date |
| --- | --- | --- |
| 295,519 | Bonner | Mar. 25, 1884 |
| 1,031,637 | Fischer | July 2, 1912 |
| 1,056,076 | Wiard | Mar. 18, 1913 |
| 1,650,674 | Weaver | Nov. 29, 1927 |
| 2,223,644 | Smith | Dec. 3, 1940 |
| 2,505,172 | Coats | Apr. 25, 1950 |
| 2,616,487 | Parks | Nov. 4, 1952 |
| 2,708,954 | Schultz | May 24, 1955 |
| 2,746,528 | Damman | May 22, 1956 |
| 2,772,726 | Mercaldo | Dec. 4, 1956 |